United States Patent [19]

Dinger

[11] 3,708,149
[45] Jan. 2, 1973

[54] CLOSURE DEVICE FOR CLOSING FLEXIBLE TUBES

[75] Inventor: Leon Joel Dinger, Harrisburg, Pa.

[73] Assignee: AMP Domestic Inc.

[22] Filed: Feb. 17, 1971

[21] Appl. No.: 116,057

Related U.S. Application Data

[62] Division of Ser. No. 812,811, April 2, 1969, Pat. No. 3,612,475.

[52] U.S. Cl. ............... 251/9, 24/30.5 W, 292/307 R
[51] Int. Cl. ................................................ F16k 7/04
[58] Field of Search ................ 251/4, 9, 10; 128/346; 24/30.5 W, 23 W; 339/276 F; 292/307 R

[56] References Cited

UNITED STATES PATENTS

| 1,474,972 | 11/1923 | Kulier | 339/276 T |
| 3,461,876 | 8/1969 | Miller | 251/10 X |
| 2,809,651 | 10/1957 | Moberg | 251/9 X |
| 3,327,709 | 6/1967 | Nehring et al. | 128/214 D |
| 3,078,533 | 2/1963 | Allen | 24/30.5 W |

Primary Examiner—Martin P. Schwadron
Assistant Examiner—Richard Gerard
Attorney—William J. Keating, Ronald D. Grefe, Gerald K. Kita, Frederick W. Raring and Jay L. Seitchik

[57] ABSTRACT

Tube closure devices comprising bendable members, each having a pair of arms connected together by integral hinges are disclosed. Coacting latch arrangements are disposed on the extending ends of the arms to latch the arms over sections of flexible tubes which are placed under compression via the closure devices. Raised floor sections on at least one of the arms serve to compress and sealingly close the tube such that residual pressures are provided in a closure. Alternate curved floor sections also assure a sealed closure and provide strain relief means in a closure where the flexible tubes join closure devices.

1 Claim, 4 Drawing Figures

CLOSURE DEVICE FOR CLOSING FLEXIBLE TUBES

CROSS REFERENCE TO RELATED APPLICATION

This application is a divisional application of application, Ser. No. 812,811, filed Apr. 2, 1969 and now U.S. Pat. No. 3,612,475.

This invention relates to closure devices of the type used to sealingly close flexible tubes.

In blood donating operations, flexible bags are generally used to collect and store human blood. Flexible tubes extending from the bags are used for a two fold purpose: First, they convey blood from the donor to the collection bag; secondly, they are used to house small samples of blood. Immediately after a donation, the technician closes the tube at intermittent sections along the length thereof. The sections may be individually removed at a later time so that the samples therein may be tested.

It is imperative that the ends of the tube be hermetically sealed so that the blood in the collection bag does not become contaminated.

Most prior tube closure devices are in the form of an intricate clip or clamp which is usually deformed when secured around a tube. This usually requires a special tool to deform the device onto the tube. Other tube closure means include an intricate welding or heat-sealing apparatus.

It is an object of this invention to provide closure devices for flexible tubes which are simple in construction, which are quick and easy to use, and which are made from nylon or other suitable plastic.

Another object is the provision of closure devices for flexible tubes which are simple in construction which are quick and easy to use, and which are made of bendable metal such as aluminum.

An additional object is to provide closure devices which will hermetically seal flexible tubes without the aid of intricate application tooling.

A further object is to provide a closure device which may be re-opened and re-used.

Still another object is the provision of closure devices of the type described which, due to their unique simplicity of design, can be manufactured inexpensively, and therefore they can be marketed as inexpensive items.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

Figure 1:
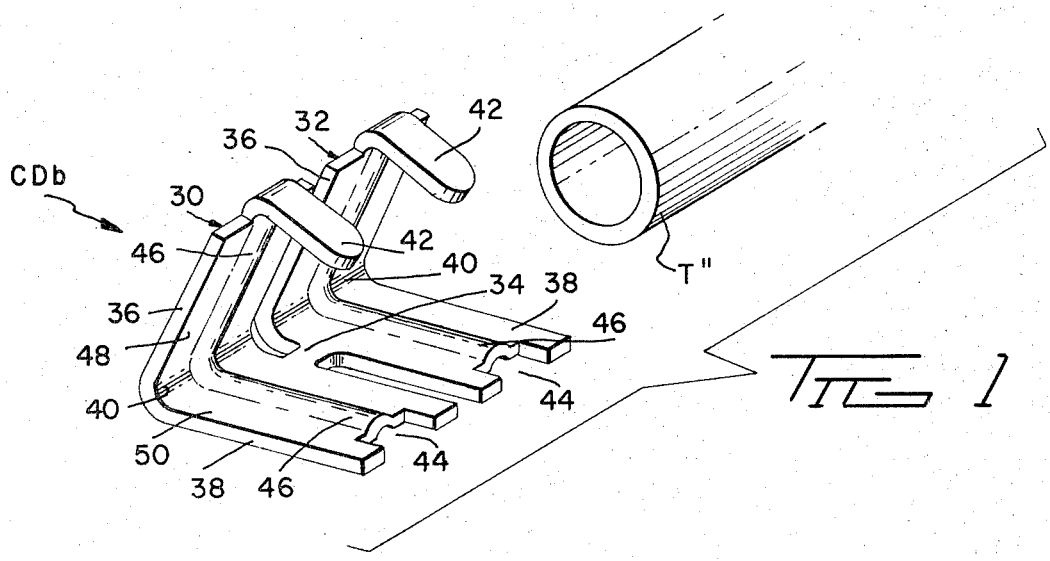
FIG. 1 is a perspective view of still another embodiment in an open position.

Referring to FIG. 1, another closure device CDb comprises a pair of V-shaped closure members 30 and 32 which are identical in shape and which are formed from bendable metal, such as, for example, aluminum. Members 30 and 32 are fabricated from flat sheet stock, and they are joined by an integral strap 34 to provide a one-piece closure device. Each member has a pair of arms 36 and 38 which are connected by respective bights 40 acting as hinges. The extending ends of arms 36 terminate in tabs 42 which are identical for each member and which are reduced in width from the width of arms 36 so as to be centrally disposed relative thereto. Tabs 42 are bent to a hook shape so as to be directed inwardly towards arms 38. The ends of arms 38 have recesses 44 defining slots to receive tabs 42. Inwardly directed ridges or ribs 46 are formed in members 30 and 32 so as to be disposed on the flat surface 48 of arms 36, along hinges 40 and on floor surfaces 50 of arms 38. The ribs may be disposed only in the members 30 and 32 and offset relative to one another or only one of members 30 and 32 may be provided with a rib.

Figure 2:
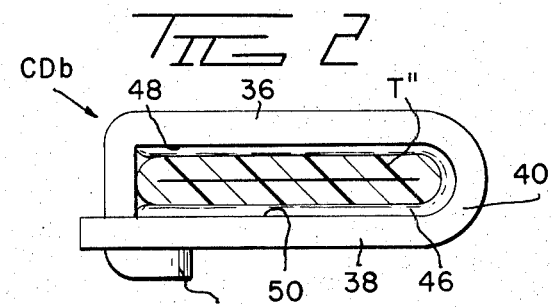
FIG. 2 is a side elevational view of the closure device of FIG. 1 closed onto a flexible tube.
Figure 3:
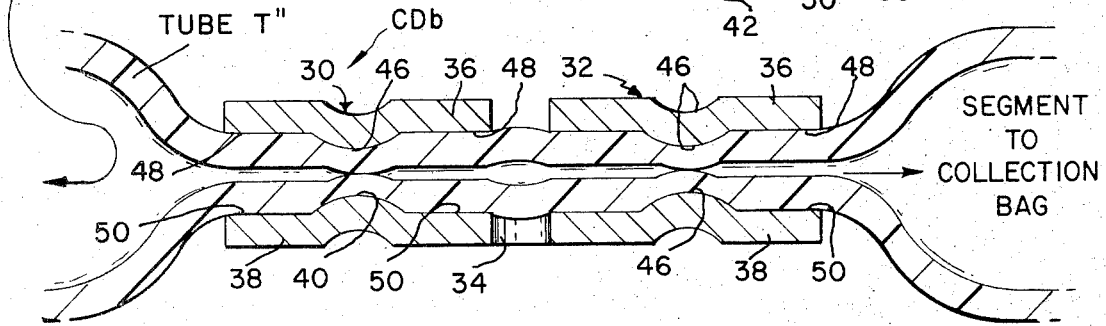
FIG. 3 is a cross-sectional view taken longitudinally through a pair of closure devices of FIG. 1 showing a flexible tube compressed.

In use, as illustrated in FIGS. 1, 2 and 3, a double closure device 30 and 32 is disposed over a flexible tube T'' whereafter the device is closed to sandwich the tube between arms 36 and 38. During closing, the tube T'' becomes generally compressed between surfaces 48 and 50 of the arms, and it is tightly compressed between ridges 46, see FIG. 3. When the devices 30 and 32 are fully closed, tabs 42 are disposed in respective recesses 44, and they are bent inwardly along arms 38, see FIG. 2. This arrangement latches the devices onto a tube and prevents them from being accidentally removed. The devices may be removed, if desired, by bending tabs 42 out of their respective recesses 44 and opening the arms 36 and 38. The closure devices may be closed onto a tube by a simple hand tool such as pliers, or they may be disposed in a simple applicator of the staple type (not shown).

Referring particularly to FIG. 3, if at some later time a sample of blood is to be checked, the end test segment of a collection tube is removed by severing a closure device along the broken line through strap 34. After severing, the end segment of the collection tube remains closed and sealed by closure device 30, and the next segment (now the end segment) remains closed and sealed by closure device 32. The segment removal procedure may be continued from time-to-time until all test segments are removed.

Figure 4:
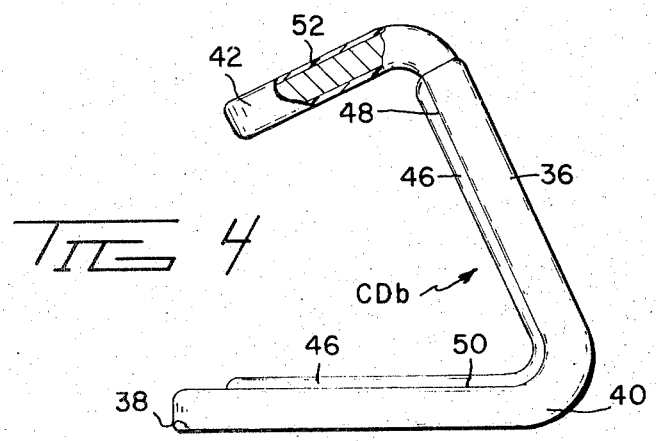
FIG. 4 is a side elevational view of a further embodiment in an open position.

Referring now to FIG. 4, the closure devices 30 and 32 may be coated with plastic material 52 in accordance with conventional plastic-coating techniques such as, for example, dipping, spraying or fluidized bed. The plastic coating will not only eliminate sharp edges on the closure device proper which may snag a tube, but it will add to the sealing characteristics of a closure device.

It should be noted that closure devices according to this invention may be used on plastic tubes other than those of blood collection apparatus. The devices may also be used on other flexible tubes such as elastomeric material. The devices not only provide a liquid seal, but they also provide an air-tight seal.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. A pair of generally V-shaped, reusable metal closure devices for closing and sealing a flexible tube comprising first arms and second arms, integral hinges at inner ends of said arms connecting said arms together, a bridge connecting said pair of devices together, said bridge positioned between two of the arms of the devices, each of said devices adapted to close onto and flatten and seal sections of the tube, each of said first arms having a tab on an outer end thereof, said tab being of less width than said first arm, a recess in each outer end of said second arms, said recesses adapted to receive said tabs when said arms are closed on the sections of the tube, said tabs further adapted to be bent under portions of said second arms to latch the arms into closed engagement onto the sections of the tube, said arms each having a centrally disposed, inwardly directed ridge on the inside surface thereof so that as said arms are closed, said ridges cooperate to tightly and sealingly engage the tube therein between.

* * * * *